(12) United States Patent
Dimig et al.

(10) Patent No.: US 7,501,595 B2
(45) Date of Patent: Mar. 10, 2009

(54) SELF-COMPENSATING MOTION DETECTOR

(75) Inventors: Steven J. Dimig, Plymouth, WI (US); David C. Janssen, Shorewood, WI (US); Erik Esser, Milwaukee, WI (US)

(73) Assignee: Strattec Security Corporation, Milwaukee, WI (US)

( * ) Notice: Subject to any disclaimer, the term of this patent is extended or adjusted under 35 U.S.C. 154(b) by 593 days.

(21) Appl. No.: 11/244,875

(22) Filed: Oct. 6, 2005

(65) Prior Publication Data

US 2007/0080049 A1 Apr. 12, 2007

(51) Int. Cl.
*H01H 3/16* (2006.01)
(52) U.S. Cl. ...................................... 200/61.62
(58) Field of Classification Search .............. 200/61.41, 200/61.42, 61.62, 61.69, 61.7, 61.71–61.76, 200/61.81, 61.82
See application file for complete search history.

(56) References Cited

U.S. PATENT DOCUMENTS

| | | | |
|---|---|---|---|
| 4,339,747 A * | 7/1982 | Maybee ...................... 340/547 |
| 4,738,334 A | 4/1988 | Weishaupt |
| 4,778,206 A | 10/1988 | Matsumoto et al. |
| 4,897,644 A | 1/1990 | Hirano |
| 5,360,351 A | 11/1994 | Periou et al. |
| 5,844,470 A | 12/1998 | Garnault et al. |
| 5,901,991 A | 5/1999 | Hugel et al. |
| 5,941,374 A * | 8/1999 | Hapke et al. ................. 200/345 |
| 6,048,003 A | 4/2000 | Shimura |
| 6,072,403 A | 6/2000 | Iwasaki et al. |
| 6,081,186 A * | 6/2000 | Adams .................. 340/426.28 |
| 6,094,131 A | 7/2000 | Chen et al. |
| 6,118,090 A * | 9/2000 | Osvatic et al. ........... 200/61.76 |
| 6,127,678 A * | 10/2000 | Christensen et al. ........ 250/239 |
| 6,181,024 B1 | 1/2001 | Geil et al. |
| 6,247,343 B1 | 6/2001 | Weiss et al. |
| 6,278,252 B1 | 8/2001 | Kachouh |
| 6,354,120 B1 | 3/2002 | Tan et al. |
| 6,380,643 B1 | 4/2002 | Losey et al. |
| 6,396,412 B1 | 5/2002 | Banas |
| 6,416,092 B1 * | 7/2002 | Rathmann ................. 292/336.3 |

(Continued)

OTHER PUBLICATIONS

Bulldog Security Installation Guide, Owner's Guide, Model 742, Door Lock Actuator (available before Oct. 6, 2005) (1 pg.).

(Continued)

*Primary Examiner*—Michael A Friedhofer
(74) *Attorney, Agent, or Firm*—Michael Best & Friedrich LLP

(57) ABSTRACT

Apparatus and method for activating a passive entry system. The motion detector can include a latch input lever, a switch, and a damper. The damper can provide more resistance to the latch input lever in order to transfer motion to the switch in response to fast movement of the door handle. In some embodiments, the motion detector can include a switch actuator, a notched lever, and a switch. Movement of the notched lever can cause the switch actuator to contact the switch. In other embodiments, the motion detector can include a switch actuator, a notched lever, and a magnetic sensor switch. The magnetic sensor switch can include a magnetic switch member that moves in response to a second end of the switch actuator in order to complete a circuit to the passive entry system.

69 Claims, 12 Drawing Sheets

U.S. PATENT DOCUMENTS

| | | | |
|---|---|---|---|
| 6,435,574 B1 | 8/2002 | Taga et al. | |
| 6,519,987 B1 | 2/2003 | Weyerstall | |
| 6,530,251 B1 | 3/2003 | Dimig | |
| 6,539,760 B1 * | 4/2003 | Letzel et al. | 70/276 |
| 6,575,003 B1 | 6/2003 | Dupont | |
| 6,588,813 B1 | 7/2003 | Marcarini et al. | |
| 6,592,157 B1 | 7/2003 | Spurr | |
| 6,594,861 B2 | 7/2003 | Dimig et al. | |
| 6,648,379 B1 | 11/2003 | Kordowski et al. | |
| 6,653,581 B2 * | 11/2003 | Bassi | 200/61.62 |
| 6,658,328 B1 | 12/2003 | Alrabady et al. | |
| 6,683,527 B1 | 1/2004 | Greenwood | |
| 6,705,140 B1 * | 3/2004 | Dimig et al. | 70/277 |
| 6,718,214 B1 | 4/2004 | Schoettle et al. | |
| 7,291,794 B2 * | 11/2007 | Woods | 200/61.62 |
| 7,329,820 B2 * | 2/2008 | Yamamoto | 200/61.62 |
| 7,360,674 B2 * | 4/2008 | Sassoon | 222/649 |
| 2002/0093418 A1 | 7/2002 | Schmitz et al. | |
| 2002/0149262 A1 | 10/2002 | Weyerstall et al. | |
| 2003/0001724 A1 | 1/2003 | Willats et al. | |
| 2003/0006617 A1 | 1/2003 | Willats et al. | |
| 2003/0006649 A1 | 1/2003 | Budzynski | |
| 2003/0009855 A1 | 1/2003 | Budzynski | |
| 2003/0029210 A1 | 2/2003 | Budzynski et al. | |
| 2003/0031025 A1 | 2/2003 | Huizenga | |
| 2003/0052538 A1 | 3/2003 | Lorenz et al. | |
| 2003/0070457 A1 | 4/2003 | Arlt et al. | |
| 2003/0074935 A1 | 4/2003 | Baukholt | |
| 2003/0101781 A1 | 6/2003 | Budzynski et al. | |
| 2003/0116977 A1 | 6/2003 | Erices | |
| 2003/0216817 A1 | 11/2003 | Pudney | |
| 2003/0217574 A1 | 11/2003 | Meis | |

OTHER PUBLICATIONS

Delphi Safety & Interior Systems, E-Loc® Electronic Door Locking and Latching System (available before Oct. 6, 2005) (1 pg.).

Delphi Electronics and Safety, Delphi Keyless Vehicle Systems (available before Oct. 6, 2005) (1 pg.).

Delphi Technologies and Innovation Recognized by the Society of Plastics Engineers, Press Releases (Nov. 25, 2002) (1 pg.).

* cited by examiner

SELF-COMPENSATING MOTION DETECTOR

FIELD OF THE INVENTION

The invention relates generally to motion detectors and more specifically to motion detectors for sensing movement of a door handle of a vehicle.

BACKGROUND OF THE INVENTION

Vehicles having a passive entry system require a means of determining when an operator of the vehicle has approached the vehicle and wants to begin the electronic authorization process. A sensor or switch mounted on or near the outside door handle may require the operator to touch or pull the handle to begin the authorization process. When the operator touches or pulls the handle, the sensor sends a signal to a control unit in the vehicle to begin the authorization process. If the operator is authorized to enter the vehicle, an unlock signal is sent to the latch and the door can be opened.

For the passive entry system to feel responsive, the steps of the authorization process must be accomplished quickly. Since the handle switch or sensor is the first step of the passive entry sequence, it is important for the switch or sensor to detect the presence of the operator as soon in the cycle as possible. Several methods can be used to achieve these results. One type of system uses a non-contact sensor to detect the near presence of an operator's hand before it contacts the door handle. This first type of system has a cycle time advantage, but comes at a cost premium. A second type of system uses a sensor to detect the presence of the operator when the operator touches the door handle. This second type of system begins to wake up the passive entry system before the operator begins to move the door handle. This second type of system has a slight time cycle advantage, but also comes at a cost premium. A third type of system uses a simple switch that detects the initial movement of the door handle once the operator begins to pull it. This third type of system must wait for actual movement of the door handle to begin the authorization process, but has a large cost advantage over the other two systems.

Each of the methods described above assumes that the sensor or switch is mounted on or near the outside door handle. Significant cost is added to the manufacturing of the vehicle when the sensor or switch is mounted on or near the outside door handle, because a separate wire harness and connector are required to provide power to and from the sensor or switch. Specially-equipped door handles are required and may require additional suppliers.

SUMMARY OF THE INVENTION

It would be advantageous for the manufacturers of vehicles to reduce the number of suppliers involved in outfitting a vehicle with passive entry and to eliminate the need for specialty door handles. In addition, a need exists for a latch system that accurately detects movement of the door handle by taking system variation and tolerance into account and is inexpensive to produce.

In some embodiments, the invention provides a motion detector coupled to a door latch and a door handle of a vehicle that includes a passive entry system. The motion detector can include a latch input lever, a switch, and a damper. The latch input lever can be coupled to the door handle. The switch can be connected to the passive entry system and can include a switch actuator. The damper can include an input side coupled to the latch input lever and an output side proximate the switch actuator. The damper can provide more resistance in order to transfer motion from the input side to the output side in response to fast movement of the door handle. The rotary damper can provide less resistance in order to not transfer motion from the input side to the output side in response to slow movement of the door handle.

Another embodiment the invention provides a motion detector that can include a switch actuator, a notched lever, and a switch connected to a passive entry system. The notched lever can be coupled to the door handle and can at least partially receive a first end of the switch actuator. The switch can be connected to the passive entry system and can be positioned adjacent to a second end of the switch actuator. Movement of the notched lever can cause the switch actuator to contact the switch.

Some embodiments of the invention provide a motion detector that can include a switch actuator, a notched lever, and a magnetic sensor switch. The switch actuator can include a first projection end and a second end. The notched lever can be coupled to the door handle and can at least partially receive the first projection end of the switch actuator. The magnetic sensor switch can be positioned adjacent to the second end of the switch actuator. The magnetic sensor switch can include a magnetic switch member that moves in response to the second end in order to complete a circuit to the passive entry system.

Further embodiments of the invention provide a motion detector including a lever coupled to the door handle and a proximity switch positioned adjacent to the lever. The proximity switch can change state in response to movement of the lever in order to complete a circuit to the passive entry system.

Other aspects of the invention will become apparent by consideration of the detailed description and accompanying drawings.

DETAILED DESCRIPTION

Figure 1:
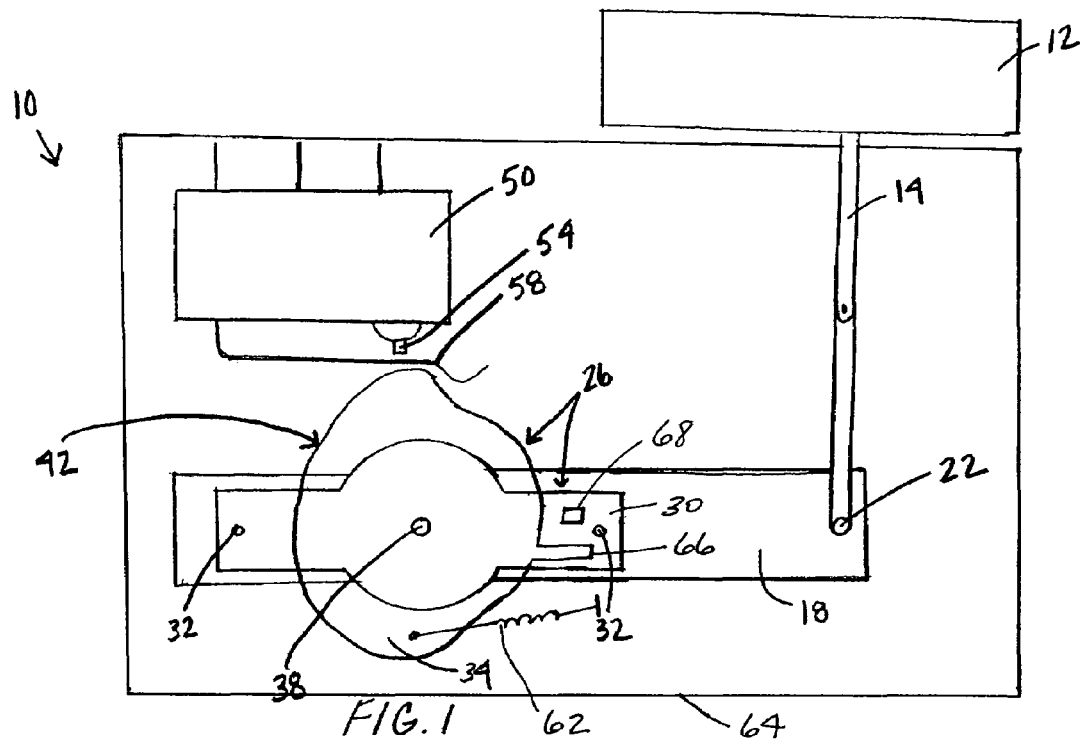
FIG. 1 is a top view of a self compensating motion detector according to one embodiment of the invention in a rest state.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings, and can include electrical connections, whether direct or indirect.

Vehicles having a passive entry system require a means of determining when an operator of the vehicle has approached the vehicle and wants to begin the electronic authorization process. For the passive entry system to feel responsive, the steps of the authorization process must be accomplished quickly. When a switch or sensor is mounted to a door handle assembly, it provides positive detection of even the slightest movement of the door handle. This is important in maintaining the responsiveness of the system and minimizing the delay felt by the operator. If the wake-up switch or sensor is relocated from the handle to the latch, several additional issues must be dealt with. Although the handle and latch input lever are linked with a rigid connecting rod, several additional issues will influence the robustness of the system and its ability to provide a responsive signal.

Several problems can occur if the wake-up switch is mounted within the motion detector and is acting directly on the latch input lever from the handle. When there is slop in the linkage, the amount of play that is present in the system between the handle, clips, rods, and the latch will cause variation in the switch actuation point. If the ratio of handle movement to switch travel is such that movement of the handle is greater than the corresponding travel of the switch, the system will be slow to respond. Ratios of handle movement to switch travel of about 1:1 are desirable. If tolerance variation in the individual components or in the assembly of the components to the door structure exists due to the manufacturing or assembly processes the tolerance variation will cause movement of the latch input lever resulting in movement of the switch actuation point. If thermal expansion of the components and/or the entire door assembly occurs, the spatial relationship between the handle and latch will be affected, resulting in movement of the switch actuation point. Permanent deformation of the components of the door assembly, either through trauma or sheet metal deformation and/or creep of plastic and metal parts will also result in movement of the switch actuation point.

Slop in the linkage can cause about 1 mm of tolerance variation, tolerance variation in the individual components or in the assembly of the components to the door structure can cause about 1 mm of tolerance variation, thermal expansion can cause about 3 mm of tolerance variation, and sheet metal deformation and/or creep of plastic and metal parts can also cause about 3 mm of tolerance variation. The combination of these tolerance variations can total nearly 8 mm or more.

If the passive wake-up switch (currently mounted in the door handle) was moved to the latch, it would be subject to far more system variation. A switch mounted to the latch and directly acting on the latch input lever from the handle could be unintentionally activated by outside forces. To compensate for these system variations, the switch actuation point would need to be adjusted by at least 8 mm to ensure that it would never be unintentionally actuated. This would reduce the sensitivity adjustment of the switch and would detract from the passive entry experience. In other words, the operator would have to pull the door handle through most of its travel before the switch would begin to wake up the system.

Some embodiments of the invention include an apparatus and method to detect movement of the door handle by using a mechanism mounted to the side door latch. A switch can be installed within the motion detector to detect motion of the latch input lever from the handle assembly. The switch may not detect the actual position of the latch input lever as its primary function, but instead can sense the relative movement of the latch input lever with respect to the latch housing. Some embodiments of the invention will not impart significant time delay to the passive entry operation. Some embodiments of the invention provide a mechanism that detects the movement of the latch input lever instead of the actual position of the latch input lever and detect the movement regardless of the starting position of the latch input lever. By detecting movement instead of position, some embodiments of the invention self-compensate for the tolerances and variations described above.

FIGS. 1-4 illustrate a self compensating motion detector 10 according to one embodiment of the invention. The self compensating motion detector 10 can be mounted on a side door of a vehicle (not shown) to sense movement of a door handle 12 of the vehicle. A translation mechanism 14 can transfer rotational motion of the door handle 12 to a latch input lever 18, and the translation mechanism 14 is coupled to the latch input lever 18 at a joint 22. The latch input lever 18 can be coupled to move with an intermediary mechanism, such as a damper 26, through one or more fasteners 32. In one embodiment, the fasteners 32 can include screws. In other embodiments, any conventional fastener 32 can be used to secure the damper 26 to the latch input lever 18, such as nails, rivets, pins, posts, clips, clamps, inter-engaging elements, and any combination of such fasteners.

The latch input lever 18 can be coupled to an input side 30 of the damper 26. The latch input lever 18 can pivot about a center point 38. An output side 34 of the damper 26 can be fluidly coupled to the input side 30 of the damper 26. The output side 34 can rotate about the center point 38 if the input side 30 of the damper 26 is rotated with a particular velocity. The output side 34 of the damper 26 can include a cam surface 42. The damper 26 can be located proximate a switch 50. The switch 50 can be coupled to a radio frequency identification transceiver (not shown) for authenticating a passive entry code transmitted by a transponder carried by the vehicle operator. A button 54 on the switch 50 can change the state of the passive entry system from a "rest" state in which the button 54 is not depressed by a switch actuator 58 to an "activated" state in which the button 54 is depressed by the switch actuator 58.

Figure 2A:
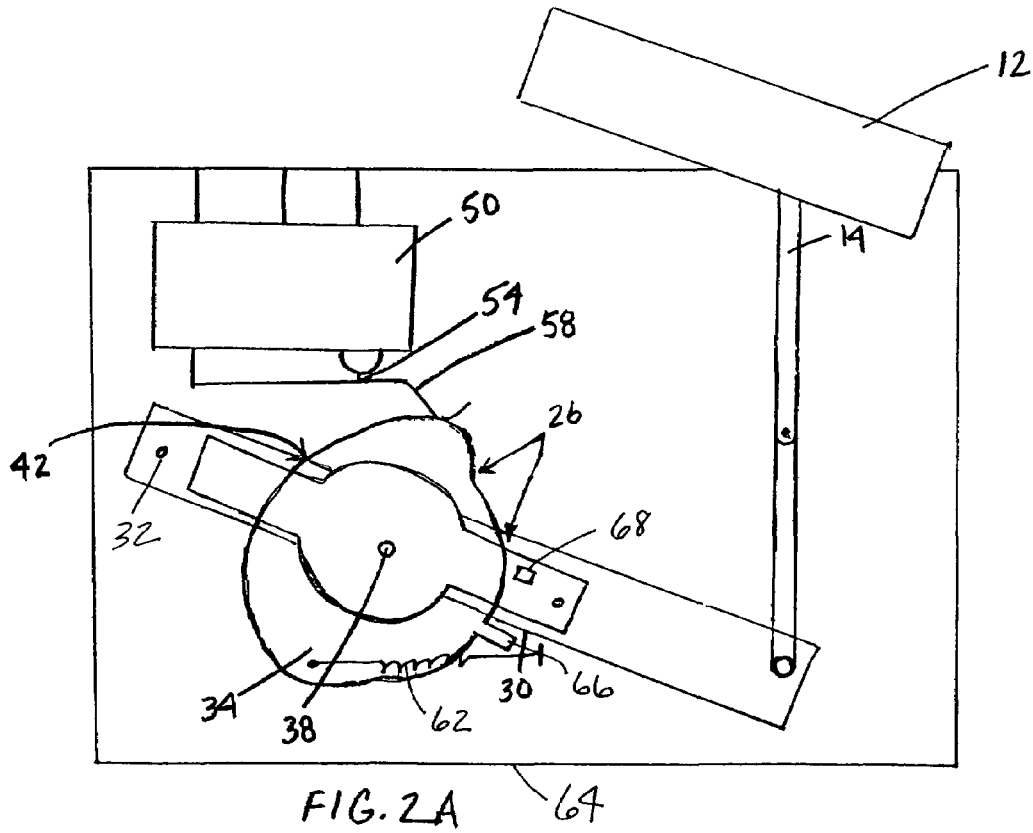
FIGS. 2A and 2B are top views of the self compensating motion detector of FIG. 1 in activated states.
Figure 2B:
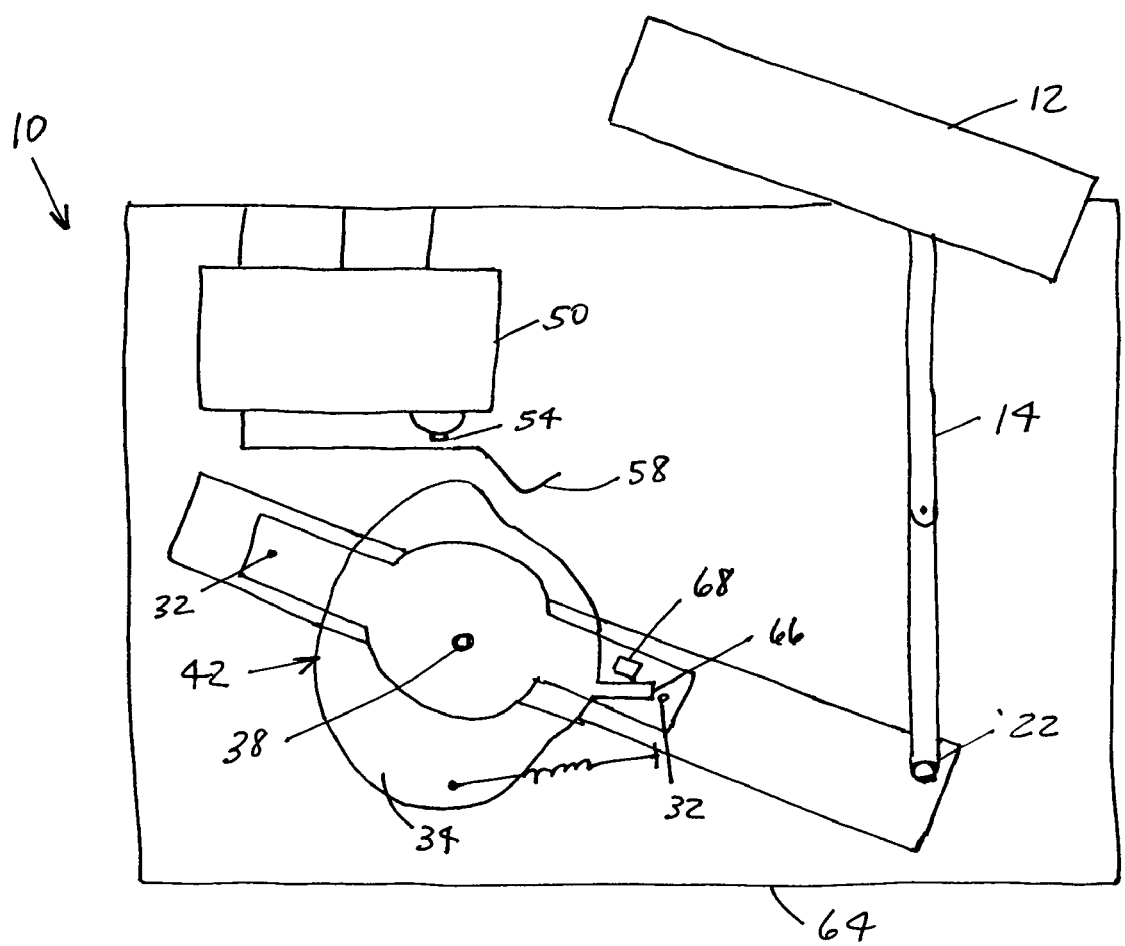
Figure 3:
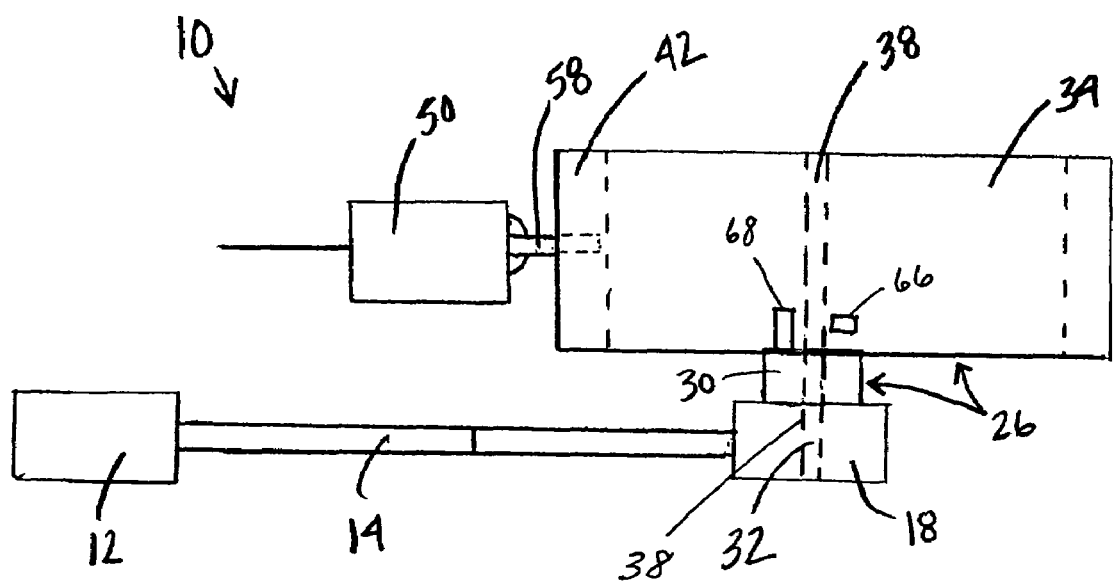
FIG. 3 is a side view of the self compensating motion detector of FIG. 1 shown in the rest state.
Figure 4:
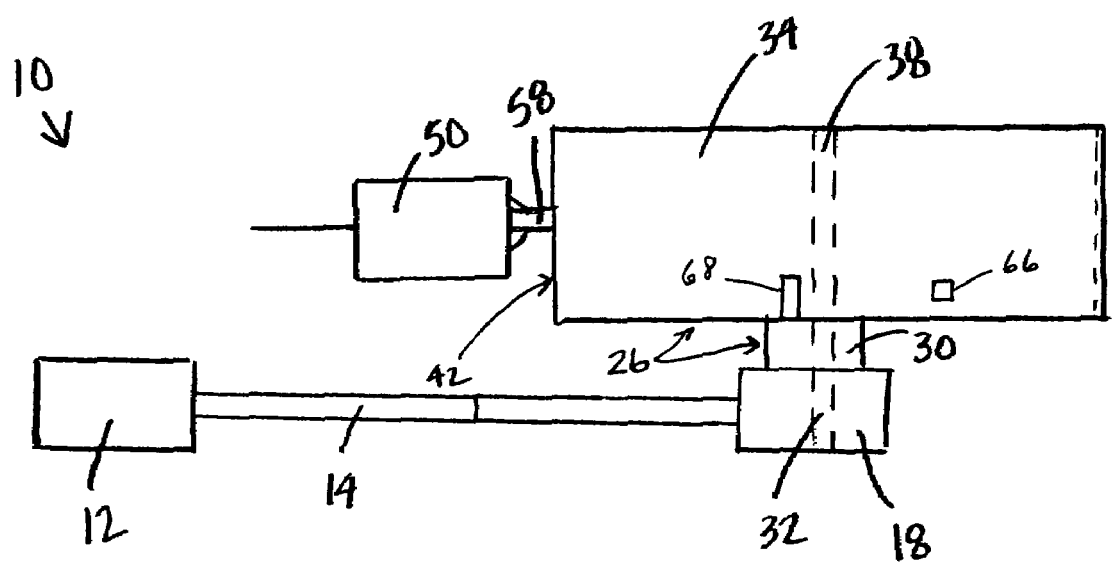
FIG. 4 is side view of the self compensating motion detector of FIG. 1 shown in the activated state.

The output side 34 of the damper 26 can be positioned such that the cam surface 42 does contact the switch actuator 58 in a first position (as shown in FIGS. 2 and 4) or the cam surface 42 does not contact the switch actuator 58 (as shown in FIGS. 1 and 3). When the cam surface 42 contacts the switch actuator 58, the button 54 is pressed such that the switch 50 undergoes a state change. In some embodiments, if the door handle 12 is moved slowly, the damper 26 provides less resistance. When the damper 26 provides less resistance, the latch input lever 18 can move independently of the damper 26 such that the output side 34 does not rotate about the center pivot 38 and the cam surface 42 does not activate the switch 50.

As shown in FIGS. 1 and 3, in the rest state, the cam surface 42 does not contact the switch actuator 58 or the button 54 of the switch 50. In the rest state, the door handle 12 is not being lifted up by an operator and the input side 30 of the damper 26 has not moved. As a result, the output side 34 of the damper 26 can remain in position due to a biasing spring 62 coupled to a latch housing 64. As shown in FIGS. 2A and 4, in an activated state, the cam surface 42 can contact the switch actuator 58 and the button 54 of the switch 50. In some embodiments, when the door handle 12 is moved quickly, the damper 26 provides more resistance. When the door handle 12 is moved quickly, the input side 30 and the output side 34 of the damper 26 move together. The movement of the input side 30 and output side 34 of the damper 26 is a result of the operator lifting up the handle 12 to thereby move the translation mechanism 14 and the latch input lever 18 that is coupled to the input side 30 of the damper 26.

In operation, when the outside door handle 12 is pulled, the translation mechanism 14 between the door handle 12 and the self compensating motion detector 10 can transfer motion to the latch handle input lever 18. Movement of the latch handle input lever 18 can rotate the input side 30 of the damper 26. The output side 34 of the damper 26 can also rotate if the door handle 12 is pulled at a relatively fast velocity. Movement of the output side 34 of the damper 26 can cause the cam surface 42 to contact a switch actuator 58 which contacts a button 54. When the button 54 is depressed, the contacts of the switch 50 can close and a passive entry wake-up signal can be generated. If the door handle 12 is pulled at a relatively fast rate, the switch 50 can be responsive to the movement of the door handle 12. When the door handle 12 is released, a torsion spring 62 can return the output side 34 of the damper 26 and the cam surface 42 to a position where the contacts of the switch 50 are open again. The torsion spring 62 can be coupled to the output side 34 or the cam surface 42 and to the latch housing 64.

When the switch actuator 58 contacts the button 54 to close the switch 50, the passive entry system can be woken up (e.g., the authorization cycle can be initiated). If an authorized signal is read, a door latch (not shown) can be unlocked. If an unauthorized signal is read, the door latch cannot be unlocked.

The damper 26 can provide a self-compensating system by allowing the input side 30 of the damper 26 to move with respect to the output side 34 of the damper 26 without movement of the output side 34, as long as the input velocity of the door handle 12 is relatively low. The freedom of movement at low input velocities can be used to absorb the tolerances and variations between the door handle 12 and the self compensating motion detector 10 located on the door latch. In other embodiments, a hydraulic damper may be used instead of a silicone damper to react similarly to fast and slow movement of the door handle 12.

In some embodiments, the motion detector 10 can include an override mechanism to wake up the passive entry system even if the door handle 12 is moved very slowly. In one embodiment, as shown in FIGS. 1-4, the override mechanism can include a finger 66 coupled to the output side 34 of the damper 26 and a finger 68 coupled to the input side 30 of the damper 26. As shown in FIG. 2B, when the door handle 12 is moved very slowly, the output side 34 of the damper 26 can remain in the position as shown in FIG. 1, while the input side 30 of the damper 26 can rotate to the position as shown in FIG. 2A. At an angle near the end of the travel of the input side 30, the finger 68 can contact the finger 66 in order to cause the output side 34 to engage the switch actuator 58.

Figure 5:
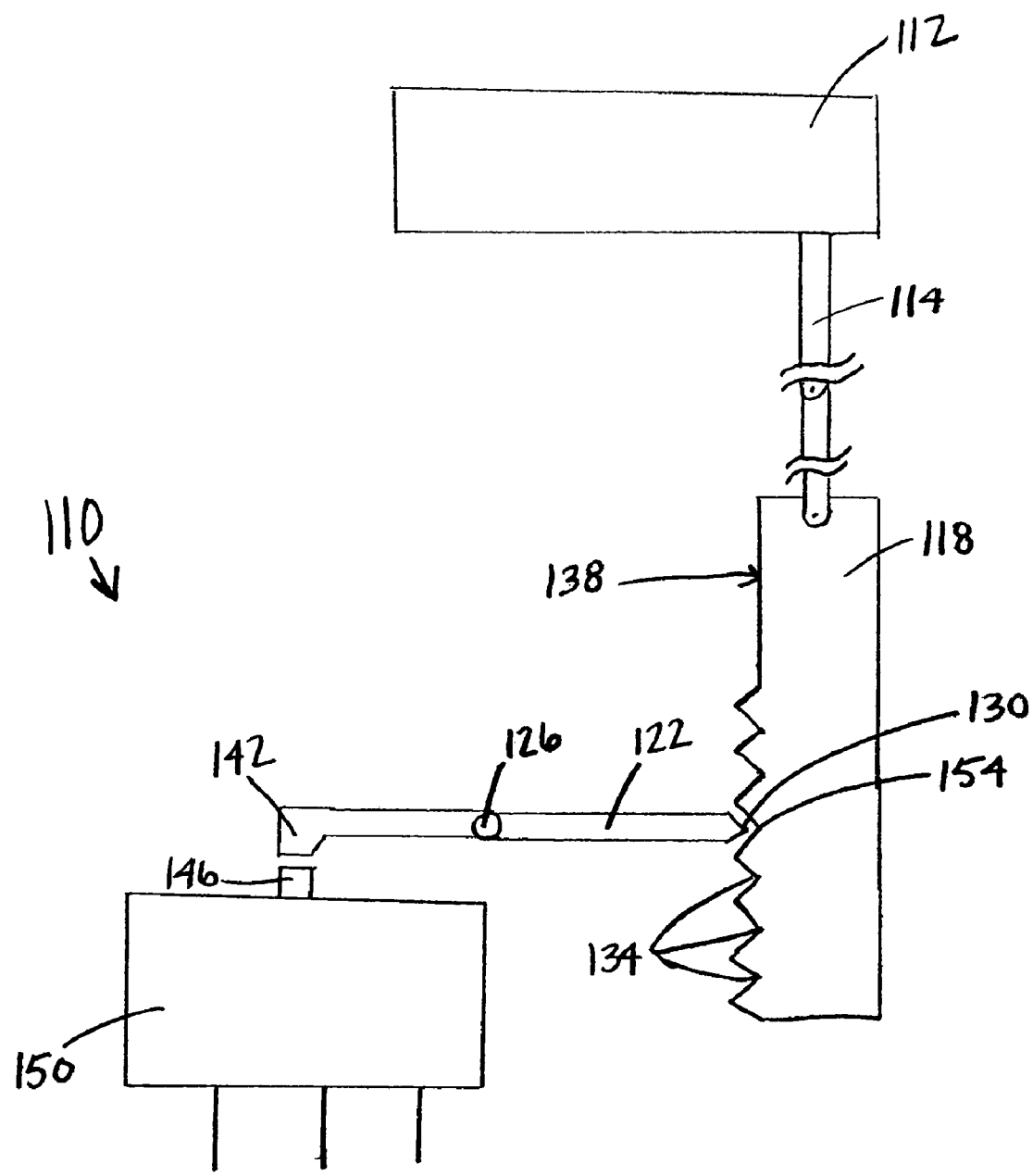
FIG. 5 is a top view of a self compensating motion detector according to another embodiment of the invention in a rest state.
Figure 6:
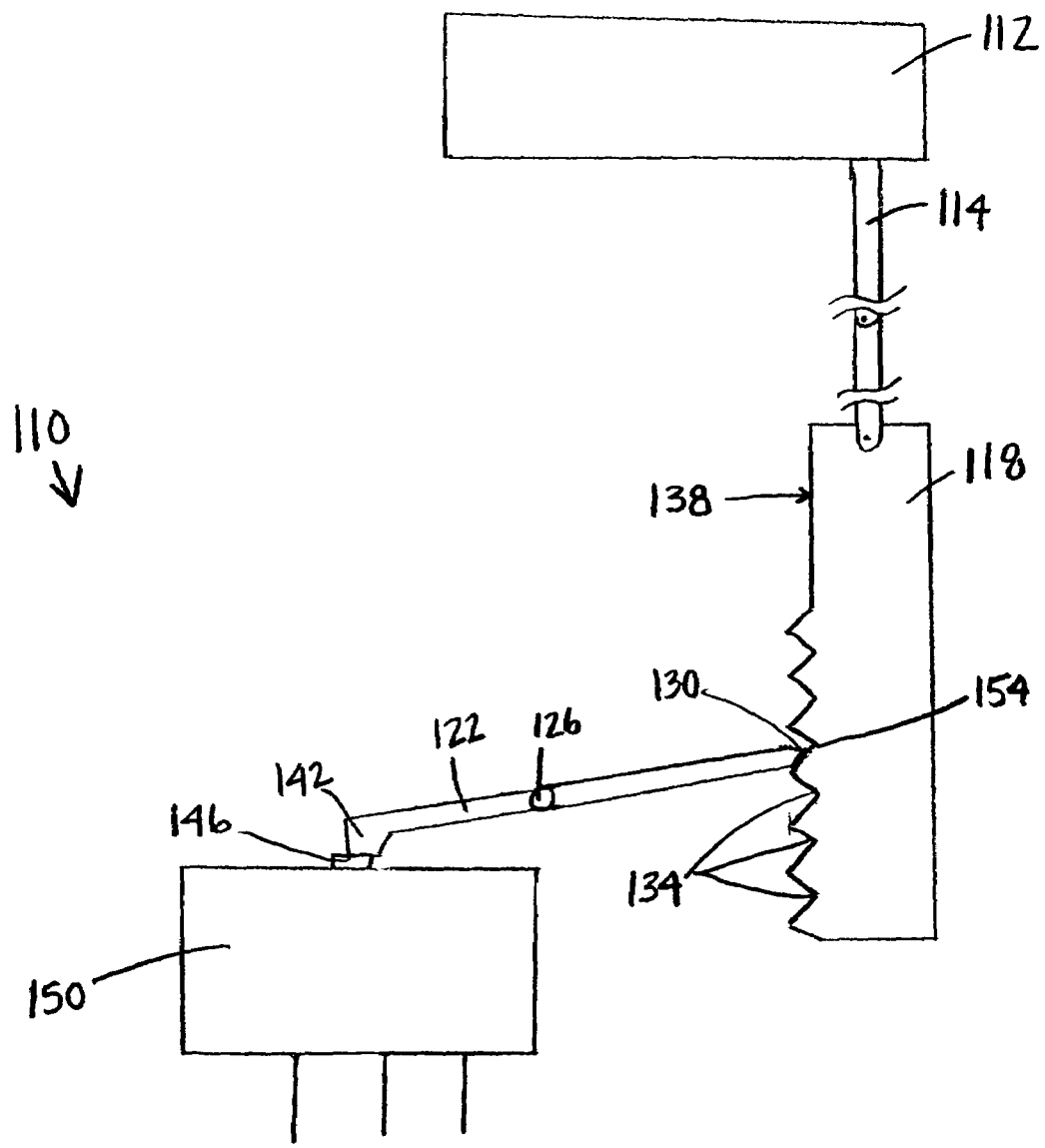
FIG. 6 is a top view of the self compensating motion detector of FIG. 5 shown in an activated state.

FIGS. 5-6 illustrate another embodiment of a self compensating motion detector 110. A translation mechanism 114 can transfer rotational motion of a door handle 112 to a notched lever 118. As shown in FIGS. 5-6, the notched lever 118 can move with the door handle 112 in a substantially vertical direction. A switch actuator 122 can be an elongated member that can rotate about a pivot 126. A pointed end 130 of the switch actuator 122 can be inserted into one of a plurality of notches 134 on an edge 138 of the notched lever 118.

As shown in FIG. 5, a contact end 142 of the switch actuator 122 can be positioned adjacent to a button 146 of a microswitch 150. FIG. 5 illustrates a rest state in which the contact end 142 of the switch actuator 122 is not contacting the button 146. As a user lifts the door handle 112, the pointed end 130 of the switch actuator 122 can remain in a notch 154 as the switch actuator 122 pivots about the pivot 126. The contact end 142 of the switch actuator 122 can contact the button 146 to close the circuit of the microswitch 150 to change from the rest state to the activated state (as shown in FIG. 6). A change of state of the microswitch 150 can be detected and interpreted as a wake-up signal for a RFID transceiver of the passive entry system. If an authorized signal is read, the door latch can be unlocked. If an unauthorized signal is read, the door latch cannot be unlocked.

The self compensating motion detector 110 can provide a self compensating system by providing multiple actuation points for the microswitch 150 as the pointed end 130 of the switch actuator 122 moves in and out of respective notches 134 of the notched lever 118. Tolerances and variations between the door handle 112 and the door latch can cause the switch actuator 122 to vary in its rest position. Regardless of the starting position of the switch actuator 122 in the notched lever 118, the microswitch 150 contacts can change state with a predetermined amount of movement of the door handle 112. In some embodiments, a vehicle control circuit can be used to differentiate a slow state change of the microswitch 150 verses a fast state change to determine if the passive entry should be activated.

Figure 7:
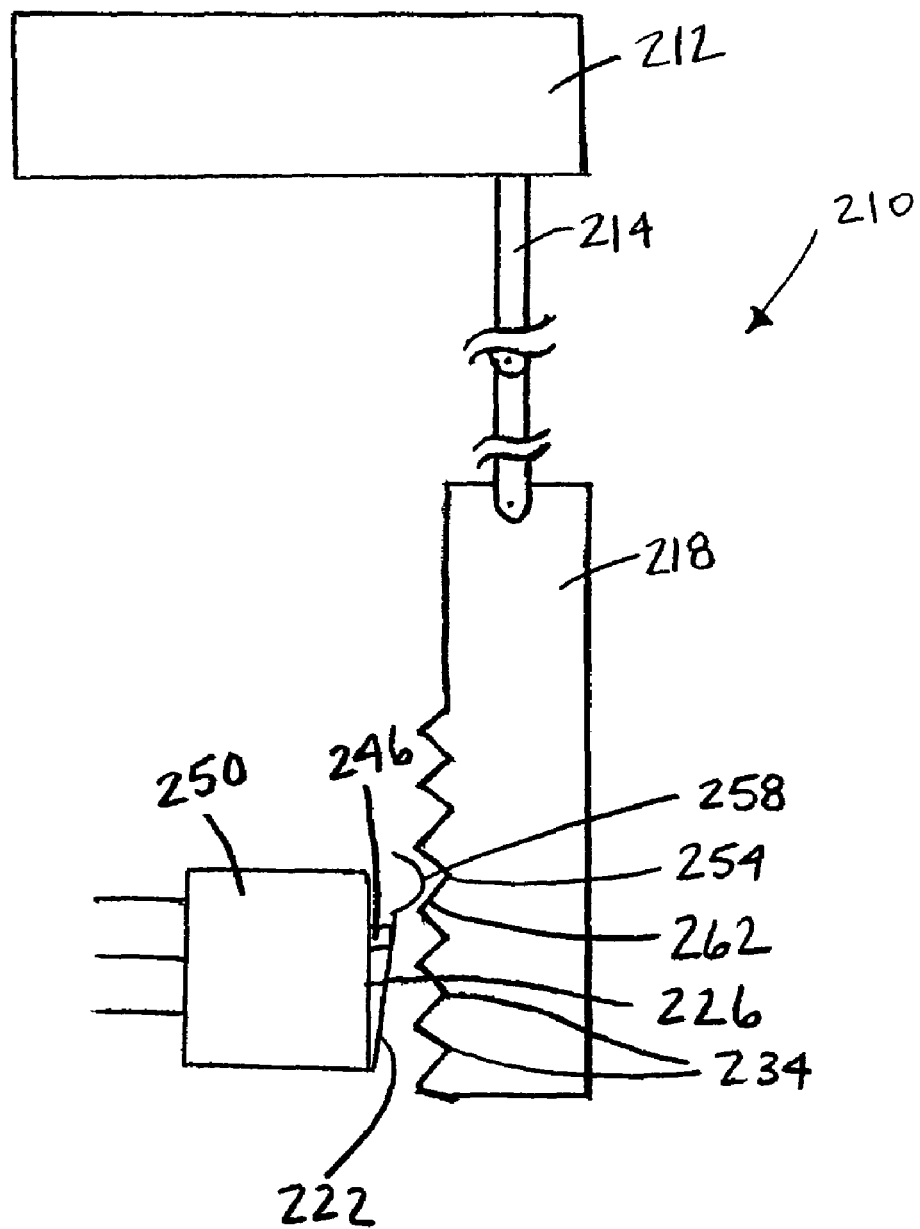
FIG. 7 is a top view of a self compensating motion detector according to another embodiment of the invention shown in a rest state.
Figure 8:
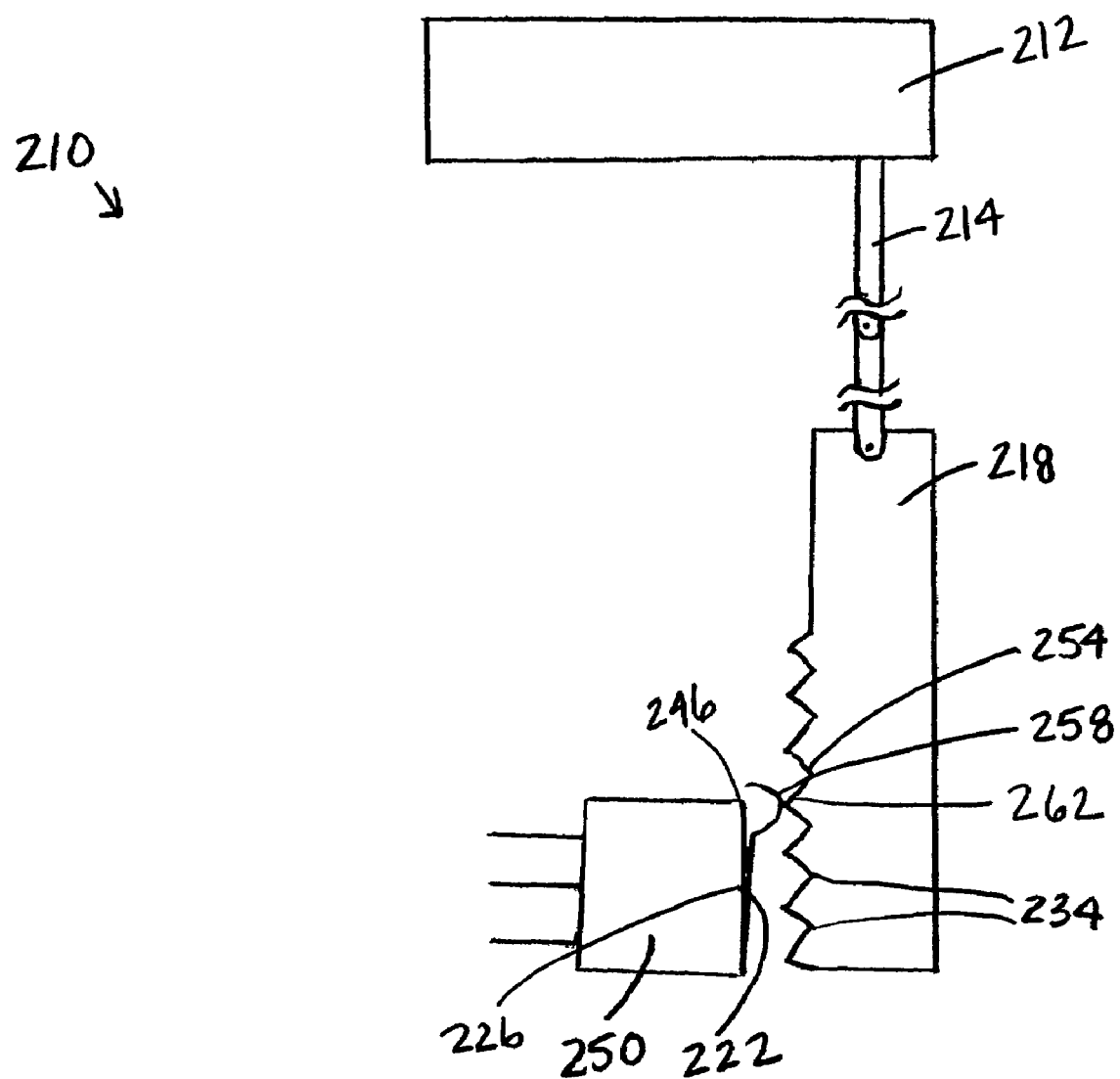
FIG. 8 is a top view of the self compensating motion detector of FIG. 7 shown in an activated state.

FIGS. 7-8 illustrate another embodiment of a self compensating motion detector 210. The self compensating motion detector 210 can include a microswitch 250, a notched lever 218, and a translation member 214. The microswitch 250 can be in a fixed positioned such that a button 246 can be located on a side 226 of the microswitch 250 parallel to the length of the notched lever 218. A switch actuator 222 can be coupled to one end of the microswitch 250 on the side 226 with the button 246. The switch actuator 222 can include a projection 258 that can fit inside one of a plurality of notches 234 of the notched lever 218.

As shown in FIG. 7, the projection 258 of the switch actuator 222 can be located inside of a notch 254. In this position, the switch actuator 222 can contact the button 246 of the microswitch 250, but not depress the button 246 to close the microswitch 250. As the operator pulls the door handle 212 upward, the notched lever 218 can move between a first position and a second position (e.g., vertically upward, vertically downward, horizontally, or diagonally) with the motion of the door handle 212 and the translation member 214. The microswitch 250 and the switch actuator 222 can remain fixed and a lower edge 262 of the notch 254 can contact the projection 258 of the switch actuator 222 to depress the button 246. Upon depressing the button 246, the microswitch 250 can be closed and can wake up the passive entry system. If an authorized signal is read, the door latch can be unlocked. If an unauthorized signal is read, the door latch cannot be unlocked.

The self compensating motion detector 210 can provide a self compensating system by providing multiple actuation points for the microswitch 250 as the projection 258 of the switch actuator 222 moves in and out of respective notches 234 of the notched lever 218. Tolerances and variations between the door handle 212 and the door latch can cause the notched lever 218 to vary its rest position. Regardless of the starting position of the notched lever 218, the microswitch 250 contacts can change state with a predetermined amount of movement of the door handle 212. In some embodiments, a vehicle control circuit can be used to differentiate a slow state change of the microswitch 250 verses a fast state change to determine if the passive entry system should be activated.

FIGS. 9A-10B illustrate another embodiment of a self compensating motion detector 310. The self compensating motion detector 310 can include a notched lever 318 and a translation member 314. An arm 322 can be coupled to a pivot 326 with a first end 330 inserted into a notch 354 of the notched lever 318. A second end 342 of the arm 322 can be positioned adjacent a magnetic sensor 346.

Figure 9A:
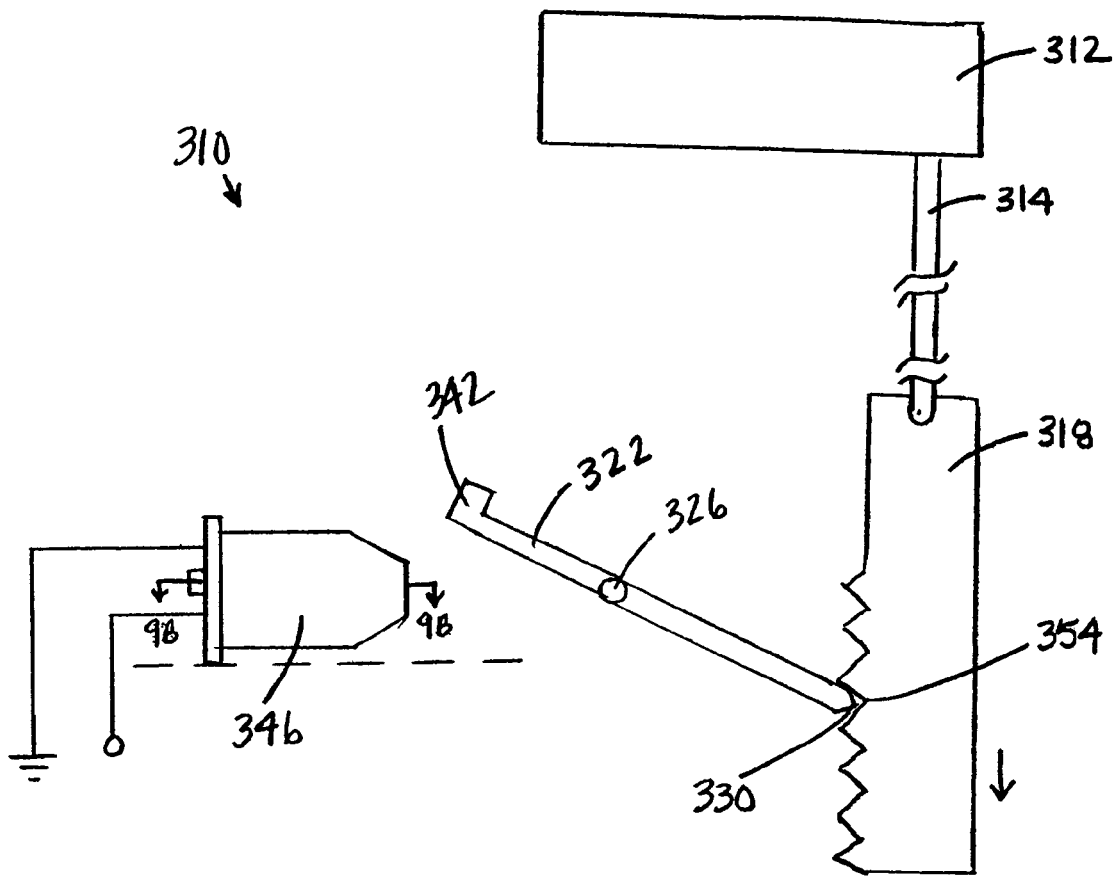
FIGS. 9A and 9B are a top view and a cross-sectional view of a self compensating motion detector according to another embodiment of the invention shown in a rest state.
Figure 9B:
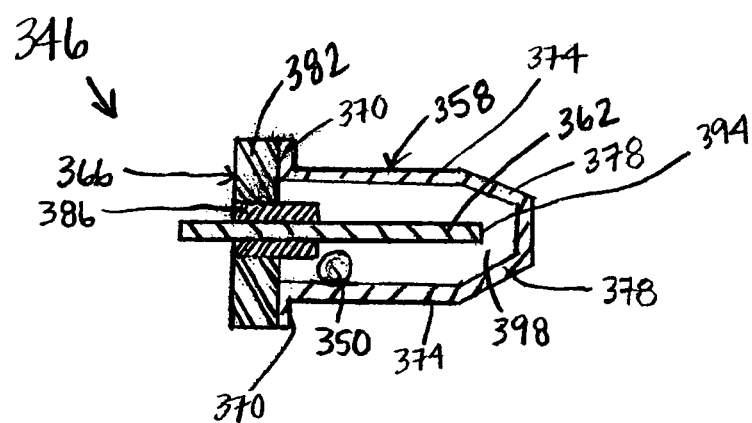
Figure 10A:
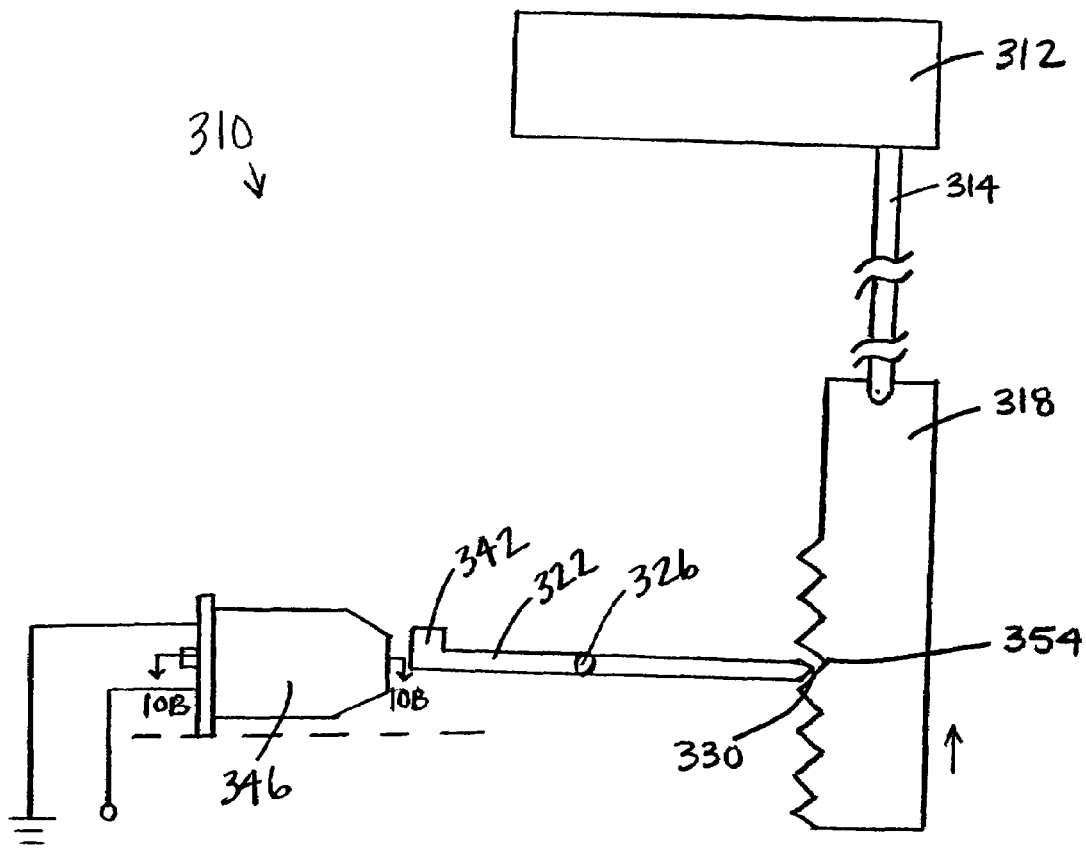
FIGS. 10A and 10B are a top view and a cross-sectional view of the self compensating motion detector of FIG. 9 shown in an activated state.
Figure 10B:
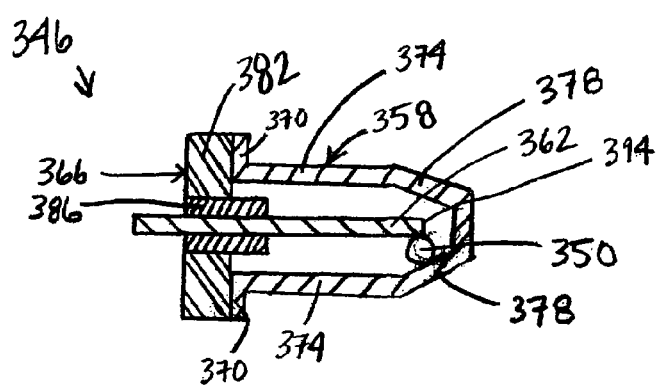

The second end 342 of the arm 322 can interact with the magnetic sensor 346. As shown in FIGS. 9B and 10B, the magnetic sensor 346 can include a switch member 350, a case 358, a conductive member 362, and a seal cap 366. The switch member 350 can be located within the case 358, which can be closed by the seal cap 366. The seal cap 366 can be secured to the case 358, forming a hermetically-sealed enclosure for the switch member 350. The conductive member 362 can be coupled to the seal cap 366 and can include one end projecting into the interior of the enclosure and an opposite end located on the exterior of the enclosure. The switch member 350 (also referred to as a body or a wipe) can be constructed of an electrically conductive material, such as a ferromagnetic material. In one embodiment, the switch member 350 is spherical in shape (i.e., a ball-shaped member) and is magnetized to have north and south poles at opposite ends of an axis through the ball-shaped member.

The case 358 can be constructed of an electrically conductive material, such as a non-magnetic material such as bronze or stainless steel. At least a portion of the case 358 can act as a first switch contact. A base portion 370 can be generally flat and side walls 374 can be formed with at least one sloping angle portion 378. The conductive member 362 (also referred to as a second switch contact) can be constructed of a non-magnetic material and can be formed in the shape of a rod or pin having a circular cross section, in one embodiment. The conductive member 362 can be supported on the cap 366.

The cap 366 can include a ferromagnetic portion 382 and an insulated layer portion 386 for insulating the conductive member 362 from the ferromagnetic portion 382. The insulated layer portion 386 of the cap 366 can include an aperture through which the conductive member 362 can extend. The conductive member 362 can be centered within the case 358 with an end 394 that can be spaced from the sloping angle portion 378 of the case 358, defining a gap 398 between the conductive member 362 and the sloping angle portion 378. The cap 366 can be welded to the case 358 to provide a hermetically-sealed bond between the case 358 and the cap 366.

As shown in FIGS. 9B and 10B, the case 358 and the conducting member 362 can act as switch contacts. The case 358 can be connected, for example, to ground, and can act as a first switch contact, and the conductive member 362 can be connected, for example, to a coded signal circuit and can act as a second switch contact. The switch member 350 can be movable within the case 358 between a switch open position (as shown in FIGS. 9A and 9B), where the switch member 350 is spaced from the conductive member 362, and a switch closed position (as shown in FIGS. 10A and 10B), where the switch member 350 contacts both the case 358 and the conductive member 362. In one embodiment, the switch member 350 can be formed of a ferromagnetic material so that movement of the switch member 350 is influenced by magnetic fields. The spherical shape of switch member 350 can make the switch member polarity insensitive. That is, the spherical-shaped switch member 350 can rotate in response to being subjected to a magnetic field produced by the actuator 322 (as shown in FIGS. 9A and 10A) to align the poles of the switch member 350 with the opposite pole of the actuator 322. This allows the switch member to be attracted to the actuator 322 regardless of the orientation of the actuator 322. The case 358 and the conductive member 362 can be formed of non-magnetic materials, in one embodiment, so that they do not interfere with the magnetic effect of the actuator 322 on the switch member 350.

As shown in FIGS. 9A and 9B, when the switch is in the open position, the ferromagnetic portion 382 can attract the switch member 350, as shown by the location of the switch member 350 adjacent to the ferromagnetic portion 382. Because of this attraction, the sensor 346 can be positioned in any orientation, and can remain in the open position until the actuator 322 is moved into an activating region of the switch. One type of a sensor 346 that is suitable for use as magnetic sensor switch is commercially available under the trade name MAGNASPHERE SWITCH, which is manufactured and sold by Magnasphere Corporation. Other switches whether or not responsive to a ferromagnetic material can also be used.

Figure 11:
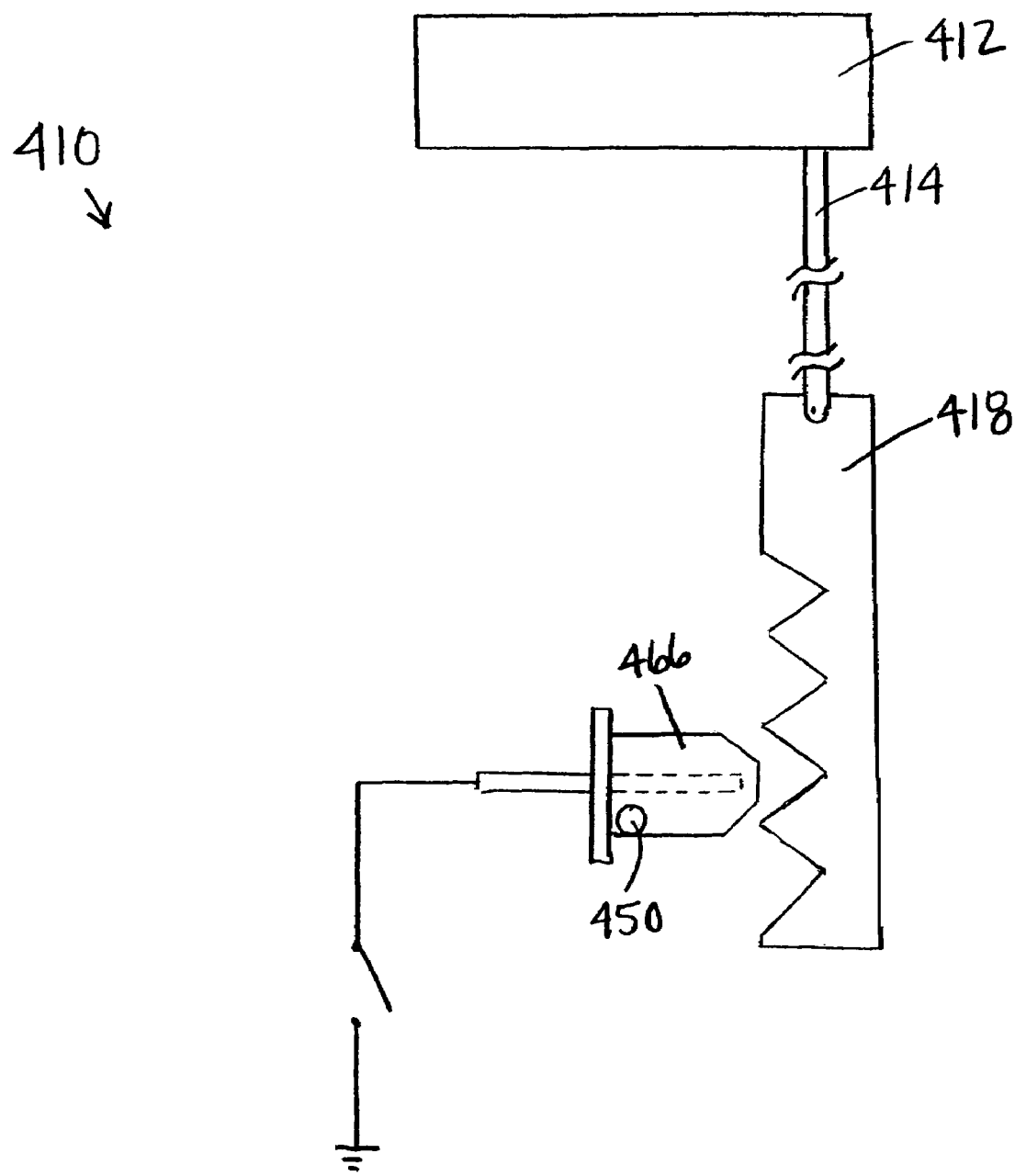
FIG. 11 is a top view of a self compensating motion detector according to another embodiment of the invention shown in a rest state.
Figure 12:
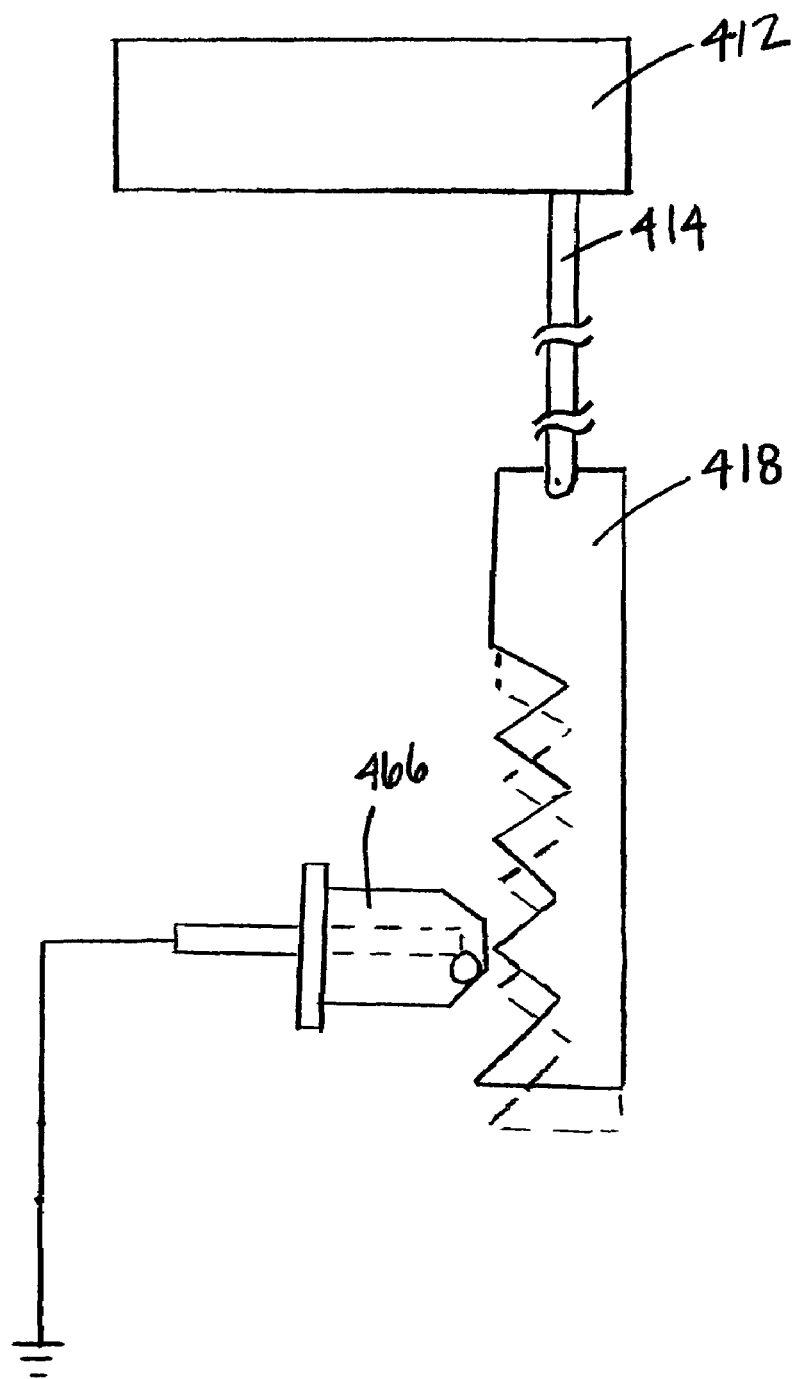
FIG. 12 is a top view of the self compensating motion detector of FIG. 11 shown in an activated state.

FIGS. 11 and 12 illustrate a self compensation motion detector 410 according to another embodiment of the invention. The self-compensating motion detector 410 can use a non-contact sensor 466 for a switch. The sensor can be a magnetic switch member 450 similar to the magnetic switch member 350 described with respect to FIGS. 9A-10B. The magnetic switch 450 can move in response to movement of a notched ferrous element 418 moving in and out of range of the sensor 466 to open and close the switch. As a door handle 412 is lifted, the magnetic field 448 of the notched ferrous element 418 can come into the range of the non-contact sensor 466 to cause the switch member 450 to close the switch of the non-contact sensor 466. A change of state of the sensor 466 can be detected and interpreted as a wake-up signal for the passive entry system.

The self-compensating motion detector 410 can provide a self-compensating system by providing multiple actuation points for the sensor 466 as the notched ferrous element 418 coupled to the translation member 414 moves. Tolerance variation and relative movement between the door handle 412 and the notched ferrous element 418 can cause the notched ferrous element 418 to vary its at-rest position with respect to the non-contact sensor 466. Regardless of the starting position of the non-contact sensor 466, the switch member 450 can change state with a relatively small movement of a door handle 412. In some embodiments, a vehicle control circuit can be used to differentiate a slow state change of the switch member 450 verses a quick state change to determine if the passive entry system should be activated.

In other embodiments, the motion detector can generally be configured according to FIGS. 9 and 10 or FIGS. 11 and 12; however, a proximity switch can be used to sense movement of the second end of the switch actuator. For example, in some embodiments, the proximity switch can include a Hall-effect sensor, a reed switch, a photo interrupter, or an optical sensor. In some embodiments, the proximity sensor can sense any magnetic material or any ferrous material. In some embodiments, rather than being notched, the lever can have another suitable configuration to engage the first end of the switch actuator.

The embodiments of the self compensating motion detector have several benefits. In some embodiments, a wire harness and connector for a switch or sensor on the door handle are generally not necessary, thereby eliminating the material and manufacturing costs. The labor cost can generally be eliminated for installing the switch or sensor, wire harness, and connector to the door handle in some embodiments. Packaging and space issues resulting from mounting a switch or sensor on a door handle can be eliminated, in some embodiments. The number of suppliers can be reduced for vehicle manufacturing, in some embodiments. In some embodiments, the handle motion sensing can be integrated with the door motion detector and can incorporate the corresponding wiring with the existing wire harness to the latch. In some embodiments, the self-compensating system can automatically adjust for assembly tolerance, thermal expansion, and component shift. A sensitive wake-up response similar to that of a sensor or switch mounted on the door handle can be maintained, in some embodiments.

Various features and advantages of the invention are set forth in the following claims.

The invention claimed is:

1. A motion detector coupled to a door latch and a door handle of a vehicle, the vehicle including a passive entry system, the motion detector comprising:
   a latch input lever coupled to the door handle;
   a switch connected to the passive entry system, the switch including a switch actuator; and
   a damper including an input side coupled to the latch input lever and an output side proximate the switch actuator, the damper providing more resistance in order to transfer motion from the input side to the output side in response to fast movement of the door handle, the rotary damper providing less resistance in order to not transfer motion from the input side to the output side in response to slow movement of the door handle.

2. The motion detector of claim 1 wherein the damper is one of a rotary damper and a linear damper.

3. The motion detector of claim 1 wherein the switch changes between a non-actuated state and an actuated state in response to fast movement of the door handle regardless of an initial position of the latch input lever.

4. The motion detector of claim 1 wherein the damper is at least partially constructed of silicone.

5. The motion detector of claim 1 wherein the output side is rotatable about a pivot if the input side rotates with a sufficient velocity in response to fast movement of the door handle.

6. The motion detector of claim 1 wherein the output side includes a cam surface that rotates with movement of the output side to a position where the cam surface contacts the switch actuator.

7. The motion detector of claim 6 and further comprising a torsion spring that causes the cam surface to rotate away from the switch changing a state of the switch.

8. The motion detector of claim 1 wherein rotary motion of the output side causes contacts on the switch to move and changes a state of the switch.

9. The motion detector of claim 1 and further comprising a linkage coupled between the door handle and the latch input lever.

10. The motion detector of claim 1 wherein the switch wakes the passive entry system.

11. The motion detector of claim 1 and further comprising a vehicle control circuit connected to the switch.

12. A method of activating a passive entry system, the method comprising:
    moving a door handle at one of a first fast rate and a second slow rate;
    moving a latch input lever in response to movement of the door handle;
    providing more resistance to the latch input lever in response to the first fast rate;
    transferring motion from the door handle to the latch input lever and to a switch actuator in response to the first fast rate; and
    actuating a switch in order to activate the passive entry system in response to movement of the switch actuator.

13. The method of claim 12 and further comprising providing more resistance to the latch input lever using a damper including an input side coupled to the latch input lever and an output side proximate the switch actuator.

14. The method of claim 13 and further comprising rotating the output side of the damper about a pivot if the input side rotates with a sufficient velocity in response to the first fast rate.

15. The method of claim 13 and further comprising providing the damper with a cam surface that rotates with movement of the input side to a position where the cam surface contacts the switch actuator.

16. The method of claim 15 and further comprising providing a torsion spring that causes the cam surface to rotate away from the switch changing a state of the switch.

17. The method of claim 13 and further comprising rotating the output side to cause contacts on the switch to close and change a state of the switch.

18. The method of claim 12 and further comprising providing less resistance to the latch input lever in response to the second slow rate and not transferring motion from the latch input lever to the switch actuator in response to the second slow rate.

19. The method of claim 12 and further comprising changing a state of the switch in response to the first fast rate regardless of an initial position of the latch input lever.

20. The method of claim 12 and further comprising providing a linkage between the door handle and the latch input lever.

21. The method of claim 12 and further comprising waking up the passive entry system by actuating the switch.

22. The method of claim 12 and further comprising connecting a vehicle Control circuit to the switch.

23. A motion detector coupled to a door latch and a door handle of a vehicle, the vehicle including a passive entry system, the motion detector comprising:
    a switch actuator having a first end and a second end;
    a notched lever coupled to the door handle, the notched lever at least partially receiving the first end of the switch actuator; and
    a switch connected to the passive entry system, the switch positioned adjacent to the second end of the switch actuator, movement of the notched lever causing the switch actuator to contact the switch.

24. The motion detector of claim 23 wherein the switch changes states in response to movement of the door handle at a first fast rate regardless of an initial position of the notched lever.

25. The motion detector of claim 23 and further comprising a pivot upon which the switch actuator rotates.

26. The motion detector of claim 23 wherein the first end of the switch actuator includes a projection that engages the notched lever.

27. The motion detector of claim 23 wherein the switch wakes the passive entry system.

28. The motion detector of claim 23 wherein movement of the door handle at a first fast rate causes the switch to activate the passive entry system, and wherein movement of the door handle at a second slow rate does not cause the switch to activate the passive entry system.

29. The motion detector of claim 23 and further comprising a vehicle control circuit connected to the switch.

30. A method of activating a passive entry system, the method comprising:
    moving a door handle at one of a first fast rate and a second slow rate;
    moving a notched lever in response to movement of the door handle;
    moving a switch actuator in response to movement of the notched lever; and
    actuating a switch in response to movement of the switch actuator in order to activate the passive entry system in response to the first fast rate of the door handle.

31. The method of claim 30 and further comprising changing a state of the switch in response to the first fast rate regardless of an initial position of the notched lever.

32. The method of claim 30 and further comprising rotating the switch actuator about a pivot.

33. The method of claim 30 and further comprising positioning a projection on the switch actuator that engages the notched lever.

34. The method of claim 30 and further comprising waking the passive entry system by actuating the switch.

35. The method of claim 30 and further comprising not waking the passive entry system in response to the second slow rate of the door handle.

36. The method of claim 30 and further comprising connecting a vehicle control circuit to the switch.

37. A motion detector coupled to a door latch and a door handle of a vehicle, the vehicle including a passive entry system, the motion detector comprising:
    a switch actuator having a first projection end and a second end;
    a notched lever coupled to the door handle, the notched lever at least partially receiving the first projection end of the switch actuator; and
    a magnetic sensor switch positioned adjacent to the second end of the switch actuator, the magnetic sensor switch including a magnetic switch member that moves in response to the second end in order to complete a circuit to the passive entry system.

38. The motion detector of claim 37 wherein the magnetic sensor switch completes the circuit to the passive entry system in response to movement of the door handle at a first fast rate regardless of an initial position of the notched lever.

39. The motion detector of claim 37 and further comprising a pivot upon which the switch actuator rotates.

40. The motion detector of claim 37 wherein the magnetic sensor switch wakes the passive entry system.

41. The motion detector of claim 37 wherein movement of the door handle at a first fast rate causes the magnetic sensor switch to activate the passive entry system and wherein movement of the door handle at a second slow rate does not cause the magnetic sensor switch to activate the passive entry system.

42. The motion detector of claim 37 and further comprising a vehicle control circuit connected to the magnetic sensor switch.

43. The motion detector of claim 37 wherein the magnetic sensor switch includes a case and a conductive member.

44. The motion detector of claim 37 wherein the second end is constructed of one of a magnetic material and a ferrous material.

45. A motion detector coupled to a door latch and a door handle of a vehicle, the vehicle including a passive entry system, the motion detector comprising:
    a switch actuator having a first end and a second end;
    a lever coupled to the door handle, the lever engaging the first end of the switch actuator; and
    a proximity switch positioned adjacent to the second end of the switch actuator, the proximity switch changing state in response to the second end in order to complete a circuit to the passive entry system.

46. The motion detector of claim 45 wherein the proximity switch completes the circuit to the passive entry system in response to movement of the door handle at a first fast rate regardless of an initial position of the lever.

47. The motion detector of claim 45 and further comprising a pivot upon which the switch actuator rotates.

48. The motion detector of claim 45 wherein the proximity switch wakes the passive entry system.

49. The motion detector of claim 45 wherein movement of the door handle at a first fast rate causes the proximity switch to activate the passive entry system and wherein movement of the door handle at a second slow rate does not cause the proximity switch to activate the passive entry system.

50. The motion detector of claim 45 and further comprising a vehicle control circuit connected to the proximity switch.

51. The motion detector of claim 45 wherein the proximity switch includes at least one of a magnetic sensor switch, a Hall-effect sensor, a reed switch, a photo interrupter, and an optical sensor.

52. A method of activating a passive entry system, the method comprising:
    moving a door handle;
    moving a notched lever in response to movement of the door handle;
    moving a switch actuator in response to movement of the notched lever, the switch actuator having a first projection end and a second end, the notched lever at least partially receiving the first projection end;
    positioning a magnetic sensor switch adjacent to the second end of the switch actuator; and
    moving a magnetic switch member of the magnetic sensor switch in response to movement of the second end in order to complete a circuit to the passive entry system.

53. The method of claim 52 and further comprising completing the circuit to the passive entry system in response to a first fast rate of the door handle regardless of an initial position of the notched lever.

54. The method of claim 53 and further comprising not completing the circuit to the passive entry system in response to a second slow rate of the door handle.

55. The method of claim 52 and further comprising rotating the switch actuator about a pivot.

56. The method of claim 52 and further comprising waking the passive entry system.

57. The method of claim 52 and further comprising connecting a vehicle control circuit to the magnetic switch member.

58. A motion detector coupled to a door latch and a door handle of a vehicle, the vehicle including a passive entry system, the motion detector comprising:
   a lever coupled to the door handle; and
   a proximity switch positioned adjacent to the lever, the proximity switch changing state in response to movement of the lever in order to complete a circuit to the passive entry system, wherein movement of the door handle at a first fast rate causes the proximity switch to activate the passive entry system and wherein movement of the handle at a second slow rate does not cause the proximity switch to activate the passive entry system.

59. The motion detector of claim 58 wherein the proximity switch completes the circuit to the passive entry system in response to movement of the door handle regardless of an initial position of the lever.

60. The motion detector of claim 58 wherein the proximity switch wakes the passive entry system.

61. The motion detector of claim 58 and further comprising a vehicle control circuit connected to the proximity switch.

62. The motion detector of claim 58 wherein the proximity switch includes at least one of a magnetic sensor switch, a Hall-effect sensor, a reed switch, a photo interrupter, and an optical sensor.

63. The motion detector of claim 58 wherein the lever includes a plurality of notches.

64. A method of activating a passive entry system, the method comprising:
   moving a door handle;
   moving a lever in response to movement of the door handle;
   positioning a proximity switch adjacent to the lever; and
   changing a state of the proximity switch in response to movement of the lever in order to complete a circuit to the passive entry system; and
   completing the circuit to the passive entry system in response to a first fast rate of the door handle regardless of an initial position of the level.

65. The method of claim 64 and further comprising waking the passive entry system.

66. The method of claim 64 and further comprising not completing the circuit to the passive entry system in response to a second slow rate of the door handle.

67. The method of claim 65 and further comprising connecting a vehicle control circuit to the proximity switch.

68. A motion detector coupled to a door latch and a door handle of a vehicle, the vehicle including a passive entry system, the motion detector comprising:
   a lever coupled to the door handled; and
   a proximity switch positioned adjacent to the lever, proximity switch changing state in response to movement of the lever in order to complete a circuit to the passive entry system, wherein the lever includes a plurality of notches.

69. A menthod of activating a passive entry system, the method comprising:
   moving a door handle;
   moving a lever in response to movement of the door handle;
   positioning a proximity switch in response to movement of the lever in order to
   changing a state of the proximity switch un response to movement of the lever in order to complete a circuit to the passive entry system; and
   not completing the circuit to the passive entry system in response to a second slow rate of the door handle.

* * * * *